(12) United States Patent
Haeffner et al.

(10) Patent No.: US 7,927,543 B2
(45) Date of Patent: Apr. 19, 2011

(54) METHOD OF TREATING A MARINE OBJECT

(75) Inventors: Mikael Haeffner, Stockholm (SE); Claes Tarras Ericsson, Saltsjo-Boo (SE)

(73) Assignee: Ekomarine AB, Nacka (SE)

( * ) Notice: Subject to any disclaimer, the term of this patent is extended or adjusted under 35 U.S.C. 154(b) by 784 days.

(21) Appl. No.: 11/868,451

(22) Filed: Oct. 5, 2007

(65) Prior Publication Data
US 2008/0025868 A1   Jan. 31, 2008

Related U.S. Application Data

(63) Continuation-in-part of application No. 10/526,596, filed on Mar. 4, 2005, now abandoned.

(30) Foreign Application Priority Data

Sep. 3, 2003   (SE) .......................... PCT/SE03/01362

(51) Int. Cl.
| | | |
|---|---|---|
| B08B 17/00 | (2006.01) | |
| C23F 11/00 | (2006.01) | |
| A61K 31/74 | (2006.01) | |
| A01N 25/00 | (2006.01) | |
| A01N 25/32 | (2006.01) | |
| A01N 25/34 | (2006.01) | |
| B32B 9/04 | (2006.01) | |
| B32B 27/36 | (2006.01) | |
| C09K 15/00 | (2006.01) | |
| C09K 15/04 | (2006.01) | |

(52) U.S. Cl. .......... 422/6; 422/1; 422/7; 422/8; 424/405; 424/406; 424/410; 424/414; 424/418; 424/77; 424/78.09; 424/780; 428/411.1; 428/412; 428/413; 428/543; 428/907; 252/397; 252/399

(58) Field of Classification Search ................. 422/1, 6, 422/7, 8; 424/405–406, 410, 414, 418, 77, 424/78.09, 780; 428/411.1, 412–413, 543, 428/907; 252/397, 399
See application file for complete search history.

(56) References Cited

U.S. PATENT DOCUMENTS 6,613,435 B1 * 9/2003 Guritza ..................... 428/413
* cited by examiner

*Primary Examiner* — Jill Warden
*Assistant Examiner* — Monzer R Chorbaji
(74) *Attorney, Agent, or Firm* — Rolf Fasth; Fasth Law Offices

(57) ABSTRACT

The method is for treating a marine object. A composition is provided that has an organic substance. The composition is applied to the marine object. The composition has a first layer and a second layer. A first organic substance on the first layer attracts bacteria. The bacteria consume the first organic substance and during this process use oxygen. The bacteria thus reduce an oxygen level in a boundary layer adjacent to a surface of the marine object. The first layer of the composition erodes to expose the second layer. The bacteria consume a second organic substance of the second layer.

9 Claims, 1 Drawing Sheet

METHOD OF TREATING A MARINE OBJECT

PRIOR APPLICATION

This is a continuation-in-part application of U.S. patent application Ser. No. 10/526,596 filed 4 Mar. 2005 that claims priority from PCT/SE03/01362, filed 3 Sep. 2003.

FIELD OF THE INVENTION

The present invention relates to a method of treating a marine vehicle or object including a self-polishing antifouling paint or boat-bottom paint.

BACKGROUND AND SUMMARY OF THE INVENTION

Accordingly, the invention relates to an antifouling paint that includes a binder of relatively low mechanical strength so that the outer paint layer will be worn away by friction with the water and any organisms that have been able to fasten to the paint layer will be carried away with said layer.

With the intention of reducing the number of organisms that fasten to the surface of an antifouling paint when the boat is generally stationary in the water, it is known to make the layer of the paint applied slippery. Moreover, it is also known to add to the paint one or more additives for further reducing the tendency of the organisms to rest on or fasten to the exposed surface of the self-polishing paint. The biologically active substances that are acceptable from an environmental aspect and which have hitherto been used to control the tendency or ability of marine creatures from fastening to the surface of the self-polishing paint, particularly such creatures as molluscs, barnacles, and the like, have a troublesomely low effect. Although being effective, other substances, for instance metal compounds such as copper oxide or tin salts, or TBT, are generally unacceptable from an environmental aspect. Accordingly, one object of the present invention is to provide a self-polishing paint which contains an environmentally acceptable substance that is effective in making it difficult for marine organisms, for example molluscs, barnacles, etc. from fastening to the water-exposed paint layer.

Another object of the invention is to provide a self-polishing paint, which also includes a substance that obstructs the process of photosynthesis in respect of algae that have fastened to the surface of the paint.

These objects of the invention are achieved, either completely or partially, with a self-polishing antifouling paint.

More particularly, the method is for treating a marine vehicle or object. A composition is provided that has an organic substance. The composition is applied to the marine vehicle. The composition has a first layer and a second layer. A first organic substance on the first layer attracts bacteria. The bacteria consume the first organic substance. The bacteria reduce an oxygen level in a boundary layer adjacent to a surface of the marine vehicle. The first layer of the composition erodes to expose the second layer. The bacteria consume a second organic substance of the second layer.

DETAILED DESCRIPTION

Figure 1:
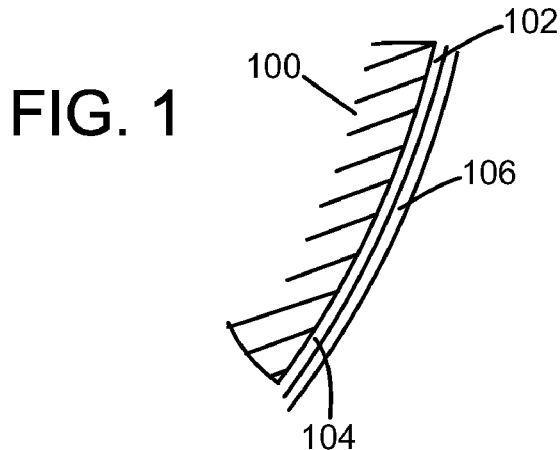
FIG. 1 is a cross-sectional front view of a marine vehicle that has the composition of the present invention applied thereon.
Figure 2:
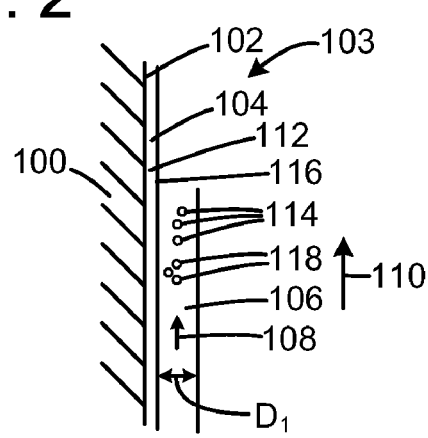
FIG. 2 is a cross-sectional top view of the marine vehicle moving at a first velocity.
Figure 3:
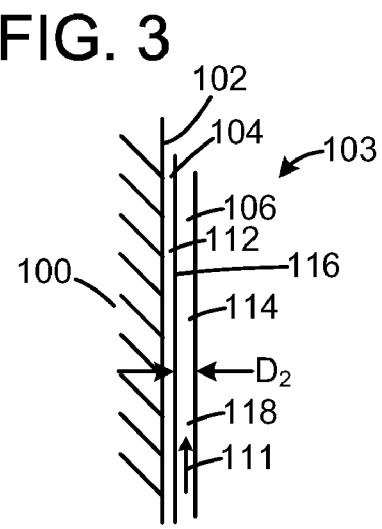
FIG. 3 is a cross-sectional top view of the marine vehicle moving at a second velocity faster than the first velocity.
Figure 4:
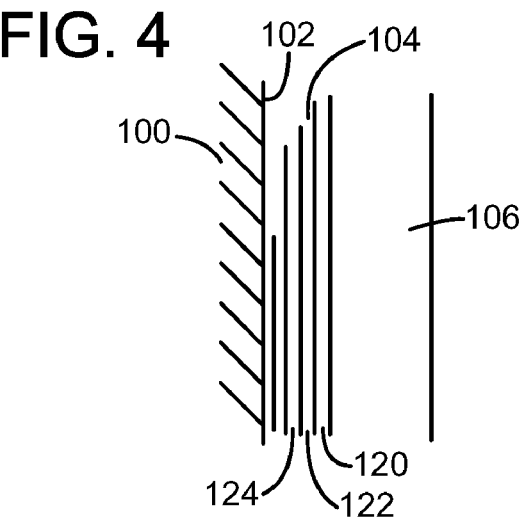
FIG. 4 is an enlarged cross-sectional top view of the marine vehicle showing the layers of the composition of the present invention.

The present invention is based on the insight that marine creatures, and particular mollusks, have a low tendency to fasten to a paint surface that has low oxygen content. The present invention is also based on the insight that the exposed outer paint layer can be given such a low oxygen content in an aqueous environment, by including in the paint a material which will decompose by bacterial activety in the presence of water while consuming oxygen from the surrounding layer of lake water/sea water. Because of its low oxygen content and possibly also because of the decomposition products from said bacterial activity, said water layer, which is thin and finds movement difficult by virtue of being received in pores and surface irregularities in the paint layer (particularly a porous outer layer of said self-polishing paint), results in a mollusk-unfriendly environment or milieu.

The material may be of a biological or chemical nature. In one preferred embodiment of the present invention, the material used is a biological material, preferably a material rich in protein, for example a vegetable material such as powdered soy. Said material, for instance the soy powder, will suitably have a particle size that lies in the range of 0.1-0.001 mm and will preferably be divided uniformly in the binder.

At least in some cases, the decomposition products of the material tend to provide an environment that is favorable to algae since they are able to provide an algae nutrient. It is therefore proposed in accordance with the invention that the inventive paint will also include a substance that obstructs the process of photosynthesis with respect to algae that fasten to the paint surface. Such photosynthesis inhibitors are well known in the art and have a relatively small environment loading effect when administered in effective dosages.

Irgarol is a photosynthesis inhibitor that is compatible with self-polishing antifouling paints.

In operation, a marine object or vehicle 100 has a surface 102 that may be protected with the composition 104 of the present invention. The surface 102 has a boundary layer 106 in which water flows at a velocity 108 relative to the vehicle 100 that is lower than a velocity 110 of the water relative to the marine vehicle 100 outside the boundary layer 106.

In the preferred embodiment, the composition 104 may be used as paint on the surface 102 of the marine vehicle 100. The composition may include an organic substance 112 that is decomposable. The organic substance 112 should have a particle size in the range of 0.001-0.1 millimeters. If the particle size is greater than 0.1 millimeters the composition 104 creates undesirable friction between the surface 102 and the surrounding water 103. If the particle size is smaller than 0.001 millimeters then the particles have a tendency to form clusters and thus form larger particles. It is also important that the organic substance 112 is thoroughly and evenly dispersed on the surface 102 to prevent undesirable growth on the all parts of the surface 102. Even if the particles do not completely cover every part of the surface 102 the lower oxygen level in the boundary layer 106 reduces the risk of hard fouling. The different fouling processes are described below.

Preferably, the gap between the particles should not exceed one millimeter.

Preferably, bacteria 116 consumes the organic substance 112 and during this process uses oxygen 114 disposed in the boundary layer 106 so that the oxygen level inside the boundary layer 106 is substantially lower than an oxygen level outside the boundary layer 106. The oxygen level inside the layer 106 may be reduced to an oxygen level that is only 1-2% of the oxygen level outside the layer 106 or in areas of surfaces that have not been treated by the composition 104 of the present invention. Preferably, the oxygen level is lowered by at least 90%, more preferably at least 95%, and most preferred by at least 98% compared to oxygen levels in untreated areas outside the boundary layer 106.

The organic substance may be any suitable organic material such as wheat gluten. It should be noted that it is not the organic substance 112 that creates the antifouling effect of the composition 104 i.e. less growth on the surface 102. The antifouling effect is created by bacteria 116, as described below. If the composition itself only includes bacteria the bacteria will eventually starve when they run out of organic substances.

The fouling effect may be divided into hard-body fouling (oxygen consuming) and light-body (photo-synthetic) fouling. Hard-body fouling may be created by muscles, oysters, worms and other such marine animals that require oxygen to live. Light-body fouling relies of the photo synthesis, by for example algae and grass, that may be negatively affected by the production of bacteria by-products such as metabolic substances. Light-body fouling is also a problem for hard-fouling since the photo synthesis process produces oxygen that sea animals need. The metabolic substances in the boundary layer 106 deter light-body fouling.

One important function of the organic substance 112 of the composition is to attract bacteria 116. The bacteria 116 consume the organic substance 112 as nourishment and during this consumption process the bacteria 116 consume oxygen 114 and create metabolites or metabolic substances 118, such as alcoholic, acid and yeast substances. The consumption process of the bacteria 116 thus drastically reduces the oxygen level in the boundary layer 106 to about 1-2% of the normal oxygen level, as indicated above.

Another important function of the surface 102 is to make the organic substance 112 available to the bacteria 116 over time. The composition 104 may include a release feature so that the composition 104 may provide sufficient organic substances of a long time such as 20 weeks. The composition 104 may be permitted to gradually erode so that layers that are deficient of organic substances fall off the surface 102. In the erosion step, the surface 102 may include a first layer 120 that falls off to expose a second underlying layer 122 that, after time, also falls off to expose a third underlying layer 124 and so on. Another option is to make the composition 104 very porous to increase the effective surface area to include organic substances that are available for consumption by the bacteria 116.

As the velocity of the marine vehicle increases, i.e. as the velocity 108 increases to the velocity 111, a thickness of the boundary layer is reduced from a thickness D1 to a smaller thickness D2. The thickness D1 may be about one millimeter. Although the thickness of the low oxygen content boundary layer is reduced as the velocity of the marine vehicle increase the risk of anything attaching to the surface 102 is also reduced at the velocity 111 compared to the low velocity 108 or when the marine vehicle 100 is at a stand still. It is important to take advantage of the lower velocity in the boundary layer 106 in order to reduce the oxygen level. If the velocity of the water immediately adjacent to the surface 102 is very high then the lowering of the oxygen level would be very temporary as new water with fresh oxygen constantly flows by.

EXAMPLE

There was prepared a paint composition corresponding to model paint composition A, although the copper oxide was excluded and replaced with dry soy meal with a grain size of 0.01 mm. The paint was applied in a surface layer. Such a model paint composition A may include 98 percent solid substance volume of tri-isopropyl silyl acrylate, 2 percent solid substance volume of hydrogen substance/Disperbyk 164 (for example Byk Chemie, Germany), 2 percent solid substance volume, silica Aerosil 200 (for example Degussa, Germany), 2 percent solid substance volume, modified polyethylene wax, Aditix M60 X (for example Supercolori, Italy), 36 percent solid substance volume of soy flour. Solid substance volume ratio: 50; solvent xylene.

The paint was applied as an antifouling paint on a boat lying in Baltic Sea water. Once exposed to the water environment, the soy flour particles went through a biological decomposition process as the outer layer of paint consumed oxygen from the adjacent layer of water. Mollusks were found to have a low tendency to fasten to the outer paint layer.

The soy flour decomposition products were found to enhance the growth of algae. A comparison paint of the same composition but without soy or any other copper oxide used and including 0.05% Irgarol (registered trademark) gave no effect with regard to the growth of mollusks but had a pronounced limitation on the growth of algae on the paint surface in contact with the water, as a result of its algaecidal effect.

The example shows that a self-polishing antifouling paint that contains a significant proportion of a material which decomposes in the presence of water while consuming oxygen from the adjacent layer of water limits the growth of mollusks on the paint and that the photosynthesis inhibitor included in the paint is able to control the increase in the growth of algae on the surface of the paint layer. The amount of biologically active substance contained by the paint will correspond to the requisite oxygen consumption over the expected lifetime of the paint. The biologically active substance can be chosen from among chemical substances and biological substances that provide said oxygen consumption in the water layer present in the wet surface layer of the self-polishing paint, said surface layer being sponge-like and thereby significantly restricting the mobility of the contained water mass. It is preferred in accordance with the invention to use a biological material which consumes oxygen when decomposing in a water environment. In addition to soy flour, there can be used fishmeal, egg powder, ground sea kelp and other similar material.

The biologically active material is incorporated in inventive antifouling paint compositions in an amount corresponding to 10-50 percent by weight, particularly with regard to the paint composition exemplified above in which dry soy flour was incorporated.

While the present invention has been described in accordance with preferred compositions and embodiments, it is to be understood that certain substitutions and alterations may be made thereto without departing from the spirit and scope of the following claims.

We claim:
1. A method of treating a marine object, comprising:
providing a composition including an organic substance;
applying the composition to the marine object, the composition having a first layer and a second layer;

a first organic substance on the first layer attracting bacteria;

the bacteria consuming the first organic substance;

the bacteria reducing an oxygen level in a boundary layer adjacent to a surface of the marine object;

the first layer of the composition eroding to expose the second layer; and the bacteria consuming a second organic substance of the second layer.

2. The method according to claim 1 wherein the method further comprises water in the boundary layer moving at a first velocity and water outside the boundary layer moving at a second velocity relative to the marine object, the second velocity being greater than the first velocity.

3. The method according to claim 1 wherein the method further comprises providing the organic substances with particle sizes in a range of 0.001-0.1 millimeters.

4. The method according to claim 1 wherein the method further comprises the bacteria reducing an oxygen level inside the boundary with over 90% compared to an oxygen level outside the boundary layer.

5. The method according to claim 4 wherein the method further comprises the bacteria reducing an oxygen level inside the boundary with over 98% compared to an oxygen level outside the boundary layer.

6. The method according to claim 1 wherein the method further comprises evenly distribute the organic substance in the composition.

7. The method according to claim 1 wherein the method further comprises the bacteria producing metabolic to deter photo-synthetic fouling.

8. The method according to claim 1 wherein the method further comprises making the composition porous to increase an effective surface area of the composition.

9. The method according to claim 1 wherein the method further comprises the marine vehicle increasing a velocity so that a velocity of a relative water flow in the boundary layer is increased and a thickness of the boundary layer is reduced.

* * * * *